United States Patent [19]

Hohorst et al.

[11] Patent Number: 5,743,768
[45] Date of Patent: Apr. 28, 1998

[54] SHUNTING LATTICE FOR ELECTRICAL DISTRIBUTORS

[75] Inventors: Wolfgang Hohorst, Minden; Lothar Roland Hennemann, Enger, both of Germany

[73] Assignee: WAGO Verwaltungsgesellschaft mbH, Minden, Germany

[21] Appl. No.: 622,682

[22] Filed: Mar. 26, 1996

[30] Foreign Application Priority Data

Mar. 29, 1995 [DE] Germany ............... 195 13 037.5

[51] Int. Cl.⁶ .................................................. H01R 11/09
[52] U.S. Cl. .................................... 439/723; 439/716
[58] Field of Search ........................... 439/723, 724, 439/787, 789, 717, 507, 510, 513, 716

[56] References Cited

U.S. PATENT DOCUMENTS

| | | | |
|---|---|---|---|
| 3,508,257 | 4/1970 | Grogan, Jr. | 439/716 X |
| 4,842,534 | 6/1989 | Mobley et al. | 439/723 X |
| 4,851,967 | 7/1989 | Gerke et al. | 439/721 X |
| 5,322,458 | 6/1994 | Hennemann et al. | 439/723 |

*Primary Examiner*—Khiem Nguyen
*Attorney, Agent, or Firm*—Salter & Michaelson

[57] ABSTRACT

The invention concerns a shunting lattice for electrical distributors that conduct the same potential, such as, e.g., PE ground conductors or reference lines, and it is proposed to arrange a two-dimensional surface structure in the form of a metal plate, an expanded metal grid or the like on the installation side of the shunting lattice, and this plate carries a mounting rail on which conventional, commercially available conductor supply terminals of large cross section are to be locked to the mounting rail with contact.

2 Claims, 2 Drawing Sheets

SHUNTING LATTICE FOR ELECTRICAL DISTRIBUTORS

BACKGROUND AND SUMMARY OF THE INVENTION

The invention concerns a shunting lattice [honeycomb] for electrical distributors with conductor supply terminals on the installation side and on the field side for incoming and outgoing electrical conductors, whereby several pole chambers arranged adjacent to one ether at least in a partial region of the shunting lattice conduct the same potential.

In distributor installations it is usual to arrange in groups the individual lines going into the field to the individual field devices (initiators, actuators or other devices, e.g., display devices), which conduct an identical potential (such as, e.g., PE ground conductors or reference lines). Shunting lattices are utilized for this purpose, whose pole chambers on the field side are wired with the individual field conductors.

On the installation side, the pole chambers of the shunting lattice are wired with individual feed lines, which conduct, e.g., the ground-conductor potential pre-given by the installation or provide the reference lines in the field with the pre-given negative reference-line potential. Thus the primary feed line coming from the installation that has a thick cross section, which can have, e.g., a line cross section of 35 $mm^2$ must be divided stepwise into so-called subdivisions into feed lines with a smaller cross section, e.g., first, they are divided into several 16 $mm^2$ lines and then to the corresponding number of 4 $mm^2$ lines, which can be wired in practice as a maximum cross section on the installation side of a shunting lattice, if the latter is designed on the field side for outgoing field lines of 1.5 $mm^2$ or smaller.

Such subdivisions of the feed lines on the installation side, i.e., in front of the installation side/field side interface defined by the shunting lattice, are commonly executed by means of distributor rails or by means of serial clamps with the use of common rails, which are locked onto a mounting rail. The arrangement of mounting rails or of distributor rails and the wiring of such subdivisions is conducted for the most part in distributor cabinets in which the shunting lattices are also mounted in suitable plug-in racks or swivel frames. Such subdistributions require additional space and a corresponding expenditure for materials and labor.

The object of the invention is to reduce both the space requirement as well as the material and labor expenditure of the subdistributions of the feed lines to the installation side/field side interface of a shunting lattice, which is utilized for the group-wise arrangement and wiring of conductors with the same potential.

This object is resolved according to the invention by the fact that the shunting lattice for pole chambers of the same potential on the installation side of the shunting lattice has essentially a two-dimensional surface structure in the form of a metal plate, an expanded metal grid, or the like, whereby the surface structure is common to all pole chambers of the same potential and is joined electrically with the conductor supply terminals present on the field side per pole chamber, and that a mounting rail is mechanically and electrically attached onto the back of the surface structure, which is turned away from the field side of the shunting lattice, in such a way that at least one conductor supply terminal on the mounting rail can be locked with a conducting connection to the mounting rail.

A particularly advantageous form of embodiment of the invention provides that the conductor supply terminals on the field side of the pole chambers have current rails, whose foot parts are bound in the surface structure electrically and mechanically on the installation side of the pole chambers.

And it is appropriate for further cost savings to select conventional, commercially available structural components for the mounting rails attached to the back of the surface structure and for the conductor supply terminals to be locked onto the mounting rail.

The instructions of the invention are persuasive due to their simple basic structure and the noteworthy advantages that can be derived therefrom. In comparison to a shunting lattice of the known structural type, all conductor individual connections of the pole chambers on the installation side are replaced by a surface structure (metal plate, expanded metal grid), on which a piece of a conventional, commercially available mounting rail (of e.g. 35×15×1.5 mm) is welded. A conventional commercially available terminal block with a large connection cross section (of e.g. 1×35 $mm^2$) is locked onto this mounting rail, and this block has a contact foot for the mounting rail, which automatically produces the contact to the mounting rail upon locking the block. This is all. The primary feed line of thick cross section coming from the installation, of e.g., 35 $mm^2$ cross section, can be directly connected onto the back side of the shunting lattice. All prior subdistributions with their space problems and their expensive wiring operations can be elimininated.

Likewise, it is possible to simply lock other terminal blocks with a contact foot to the mounting rail on the back-side mounting rail of the new shunting lattice, if cross connections to other shunting lattices of this type are produced in a distributor cabinet or if it is desired for other reasons to lock more than one terminal block or several terminal blocks with cross sections of different sizes, both large and/or small, onto the back-side mounting rail of the new shunting lattice.

The solution of the invention may be executed on the total surface of the shunting lattice as well as on partial regions. The surface structure can be arranged recessed in the shunting lattice and can be covered reliably by means of an insulating-material covering plate.

BRIEF DESCRIPTION OF THE DRAWINGS

An example of embodiment of the invention will be described in more detail below on the basis of the drawings.

DETAILED DESCRIPTION OF THE PREFERRED EMBODIMENTS

Figure 1:
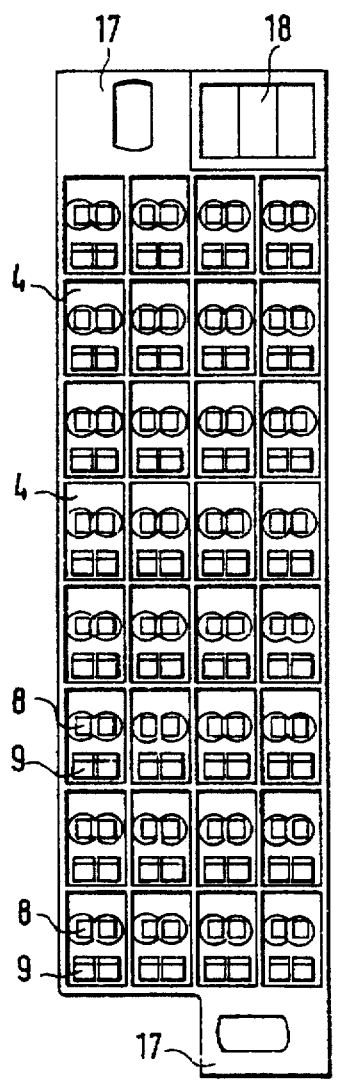
FIG. 1 shows the field side of the new shunting lattice.
Figure 3:
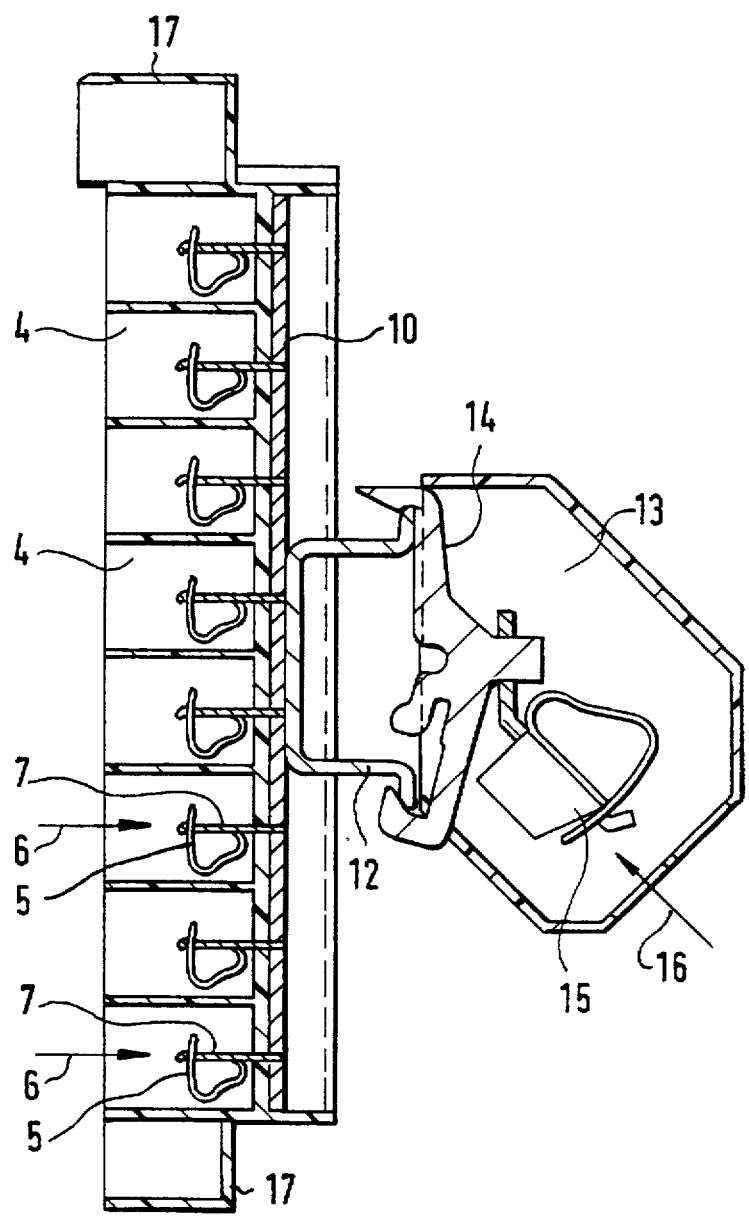
FIG. 3 shows a longitudinal section through the new shunting lattice.

FIG. 1 shows the field side of a 32-pole shunting lattice. The individual pole chambers 4 have two conductor supply terminals on the field side in the form of spring-loaded terminal connections shown in FIG. 3, each comprised of a spring-loaded terminal, one leg of which is formed as a tension spring leg 5 and clamps an electrical conductor (=field conductor) introduced in an opened contact point in the direction of arrow 6 against the current rail 7. The contact points are covered by an insulation-material housing wall, in which conductor introduction openings 8 and actuating openings 9 are present for opening the respective contact points (see FIG. 1). Such spring-loaded conductor supply terminals are known for shunting lattices, but they can alternatively be designed in any other known connection technique, for example, as screw connections, flat-plug connections, wire-wrap connections or the like. The execution is not important for the invention.

Figure 2:
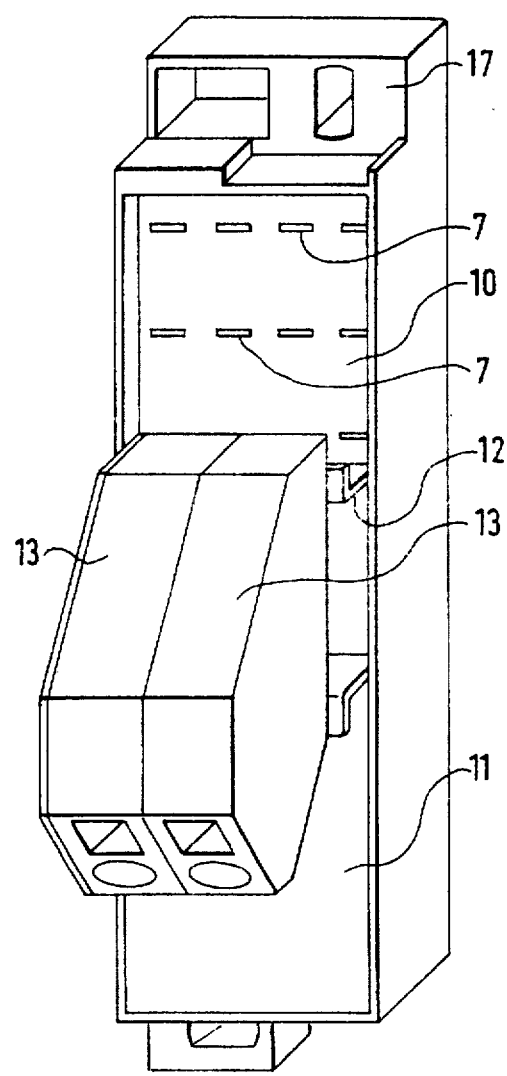
FIG. 2 shows the installation side of the new shunting lattice.

According to the instructions of the invention, in the example of embodiment that is shown, a metal plate 10 is present on the installation side of the shunting lattice, and this plate covers all pole chambers of the same potential as a two-dimensional surface structure. In the example that is shown, all pole chambers conduct the same potential, i.e., the installation side of the shunting lattice is covered by metal plate 10 over the whole surface. The foot parts of current rails 7 present on the field side of the pole chambers of the individual field-conductor contact points are soldered into metal plate 10, which may comprise, for example, copper. FIG. 2 shows in the upper region the back of metal plate 10 with the soldered foot parts of current rails 7. In the lower region of FIG. 2, the metal plate is covered by means of an insulation-material covering plate 11, which—if desired—may also be arranged on the back side of the shunting lattice.

A short piece of a commercial mounting rail 12, which may also consist of copper, is welded onto the back of the copper metal plate 10, or is attached mechanically end electrically in another suitable way. Two commercial terminal blocks 13 are locked onto this locking rail in the example of embodiment that is shown, and these blocks each have a contact foot 14, which automatically contacts mounting rail 12 upon mounting the terminal block onto the mounting rail, and in this way the mounting rail is connected electrically with contact point 15 of the conductor with large cross section. For example, a 16 mm² lead line coming from the installation can be introduced in the direction of arrow 16 into the contact point and is clamped there, while on the other hand, the conductors coming from contact points 5/7 into the field may have a conductor cross section of 1.5 mm² or smaller.

The second terminal block 13 locked on mounting rail 14, in the example of embodiment that is shown, serves for the purpose of further conducting the incoming line of large cross section to another shunting lattice of the same type in the same distributor cabinet.

The incorporation of the shunting lattice that is shown in a distributor cabinet or the like is produced as a complete unit in a plug-in racks or swivel frame of the distributor cabinet by means of attachment flange pieces 17, whereby carrier field 18, in the known way, serves for the group inscription of the shunting lattice.

What is claimed is:

1. Shunting lattice having conductor supply terminals on an installation side and on a field side thereof for incoming and outgoing electrical conductors, and several pole chambers being arranged adjacent to one another at least in a partial region of the shunting lattice conduct the same potential, said shunting lattice comprising:

pole chambers (4) of the same potential on the installation side of the shunting lattice having an essentially two-dimensional surface structure (10) in the form of a metal plate, and an expanded metal grid, said surface structure being common to all pole chambers of the same potential and being electrically connected with conductor supply terminals (5, 7) present on the field side per pole chamber; and a mounting rail (12) attached mechanically and electrically on the back of said surface structure (10), said mounting rail being turned away from the field side of the shunting lattice in such a way that at least one conductor supply terminal (13) on the mounting rail can be in electrical connection with said mounting rail with a conducting connection (14) to be locked to the mounting rail, wherein the conductor supply terminals on the field side of pole chambers (4) have current rails (7), whose foot parts are joined mechanically and electrically into surface structure (10) on the installation side of the pole chambers.

2. Shunting lattice having conductor supply terminals on an installation side and on a field side thereof for incoming and outgoing electrical conductors, and several pole chambers being arranged adjacent to one another at least in a partial region of the shunting lattice conduct the same potential, said shunting lattice comprising:

pole chambers (4) of the same potential on the installation side of the shunting lattice having an essentially two-dimensional surface structure (10) in the form of a metal plate, and an expanded metal grid, said surface structure being common to all pole chambers of the same potential and being electrically connected with conductor supply terminals (5, 7) present on the field side per pole chamber; and a mounting rail (12) attached mechanically and electrically on the back of said surface structure (10), said mounting rail being turned away from the field side of the shunting lattice in such a way that at least one conductor supply terminal (13) on the mounting rail can be in electrical connection with said mounting rail with a conducting connection (14) to be locked to the mounting rail, wherein surface structure (10) is arranged in a recessed manner in the shunting lattice and is covered by means of an insulation-material covering plate (11).

* * * * *